No. 699,944. Patented May 13, 1902.
R. W. CARMAN & F. M. LAWRENCE.
FORMALDEHYDE GAS GENERATOR.
(Application filed Feb. 4, 1902.)

(No Model.)

WITNESSES
Gustave Dietrich
Edwin N. Dietrich.

INVENTORS
Ringgold W. Carman
Frederick M. Lawrence
BY
Chas. C. Gill
ATTORNEY

UNITED STATES PATENT OFFICE.

RINGGOLD W. CARMAN AND FREDERICK M. LAWRENCE, OF FLUSHING, NEW YORK.

FORMALDEHYDE-GAS GENERATOR.

SPECIFICATION forming part of Letters Patent No. 699,944, dated May 13, 1902.

Application filed February 4, 1902. Serial No. 92,583. (No model.)

*To all whom it may concern:*

Be it known that we, RINGGOLD W. CARMAN and FREDERICK M. LAWRENCE, citizens of the United States, and residents of Flushing, in the borough of Queens and State of New York, have invented certain new and useful Improvements in Formaldehyde-Gas Generators, of which the following is a specification.

The invention relates to improvements in formaldehyde-gas generators; and it consists in the novel features and structure hereinafter described, and particularly pointed out in the claims.

The object of the invention is to produce as a new article of manufacture a formaldehyde-gas generator capable of safe and convenient use for deodorizing and disinfecting purposes, and our new article of manufacture comprises a cake, piece, or tablet of formaldehyde gas in its solid form known as "paraform" or "para-formaldehyde" and a superposed piece or cake of carbon or other suitable material which will burn without flaming and without igniting the paraform or emitting smoke or foreign odors, the heat generated by the carbon serving to revert the paraform into formaldehyde gas.

The invention and satisfactory means for carrying the same into effect will be fully understood from the detailed description hereinafter presented, reference being had to the accompanying drawings, in which—

Figure 1:
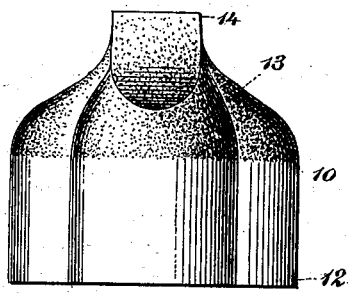
Figure 2:
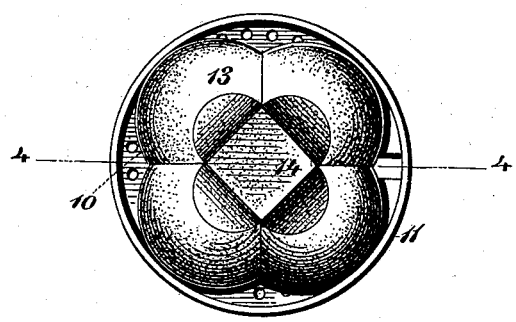
Figure 3:
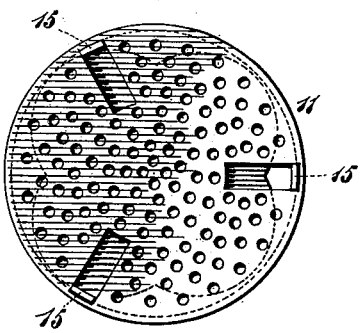
Figure 4:
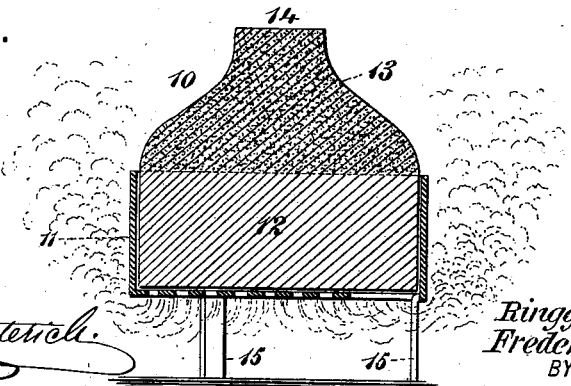

Figure 1 is a side elevation of a formaldehyde-gas generator constructed in accordance with and embodying our invention. Fig. 2 is a top view of same set within a receiving-receptacle. Fig. 3 is a bottom view of same and said receptacle, and Fig. 4 is a vertical section of same on the dotted line 4 4 of Fig. 2.

In the drawings, 10 designates the gas-generator, and 11 a suitable receptacle therefor. The generator 10 comprises a lower cake, piece, or tablet 12 of the paraform or para-formaldehyde and an upper cake, piece, or tablet 13, preferably of cone shape, of carbon or other material which will burn without flaming. The cake, piece, or tablet 12 is of usual character, and the cake, piece, or tablet 13 is preferably formed of vegetable charcoal mixed with water and a light binding agent, such as a little gum-arabic, whereby it may be given definite form, the vegetable charcoal prior to being mixed with the water and gum-arabic being in a finely-pulverized condition. The carbon cake, piece, or tablet 13 thus prepared will answer for all usual purposes; but in order that it may be readily ignited by means of an ordinary match we mix with the charcoal a very small quantity of nitrate of potash, there being about one part of nitrate of potash to about sixty parts of the charcoal. At the apex of the cake or tablet 13 is formed the elevation 14, having sharp edges to facilitate the ignition of the tablet by means of an ordinary match, the flame of the match being applied to one of these edges. The cakes or tablets 12 and 13 will be brought into face-to-face contact, as illustrated, and they may be permanently secured together, which will be the commercial form of the article, by means of a very small quantity of gum-arabic or other adhesive agent.

Our new article of manufacture thus comprises the tablet or cake of paraform or paraformaldehyde 12 and the cake or tablet 13 of carbon or other material which will burn without flaming. We prefer that the cake or tablet 13 shall consist mainly of vegetable charcoal; but there are other substances which will burn without flaming and which, with probably less satisfaction, could be substituted for the vegetable charcoal. The employment of nitrate of potash with the vegetable charcoal is for enabling the convenient ignition of the charcoal from the flame of an ordinary match; but it will not be necessary at all times to make use of the nitrate of potash, since the tablet 13 when made without the nitrate of potash may be ignited from the flame of a gas-jet or other strong flame. In many instances, however it will be desirable to ignite the tablet 13 at its apex with the use of an ordinary match, and hence the admixture of the nitrate of potash with the vegetable charcoal will be found to be of great advantage.

In the employment of our gas-generator the tablet 12 should not rest upon a solid surface, such as upon a plate or saucer, but should be superposed, so that in use the gas may escape from the lower surface of the said tablet. We have provided, therefore, for convenience the receptacle 11 (shown in the drawings) to receive the generator 10, this receptacle being in the nature of a shallow tin dish having a perforated bottom and standing on legs 15, which may be stamped out of metal constituting the bottom of the receptacle, the strips constituting the legs 15 being cut from the bottom of the receptacle and bent downward to form legs. The gas-generator 10 will freely enter the open top of the receptacle 11 and rest therein, with the carbon cake or tablet 13 exposed above the upper edges of the receptacle.

In the employment of the invention the generator 10 will be placed in the receptacle 11, and the receptacle 11 should be set upon a plate or dish. The apex of the carbon 13 will then be ignited by means of a match or other suitable flame, and the room to be deodorized or disinfected will be closed, as usual. The carbon having been ignited will slowly burn without flaming, and at the proper time the heat generated by the carbon will affect the cake or tablet 12 and revert the same into pure formaldehyde gas without igniting the paraform or emitting smoke or foreign odors. In the employment of the cake or tablet 13 the gas will not commence to generate for about ten minutes after the application of the match to said carbon, thereby affording ample time for the closing of the apartment to be deodorized or disinfected.

Our new article of manufacture is thus one of great simplicity and convenience and in addition is inexpensive and capable of use without requiring bulky or complicated apparatus or any scientific knowledge on the part of the persons employing the same. In the employment of the generator of our invention the carbon does not emit sparks or smoke and the paraform does not flame.

The gas-generator of our invention possesses a number of advantages, among which it may be mentioned that the cake or tablet 12 is protected from being ignited when a match is applied to the apex of the tablet 13 by means of the side walls of the receptacle 11, which walls, as shown in Fig. 4, extend upward to the lower edges of the carbon tablet 13, and that the tablet 13, which is to be set aglow, is of cone shape and coextensive at its base with the upper surface of the cake or tablet 12, upon which it is placed, whereby several distinct benefits are secured. By reason of the cone shape of the carbon tablet 13 the latter may be ignited at a substantially central point and a uniform combustion of said tablet secured, the apex of the tablet 13 first becoming aglow and the distribution of the heat and burning of the tablet being substantially uniform throughout the tablet 13 during the use of the latter, the tablet 13 not burning down to the formaldehyde tablet 12 at one side or in streaks or spots, but substantially uniformly throughout the entire horizontal area of the tablet 13. This uniform burning of the tablet 13 is of the greatest advantage, because thereby we are enabled to generate a maximum quantity of gas within the minimum amount of time, since the heat is communicated to the tablet 12 substantially uniformly throughout its entire area in horizontal section. The fact that the carbon tablet 13 is above the tablet 12 is also of advantage in that thereby the ash which is formed by the consumption of the tablet 13 remains upon the tablet 12 and forms a means for confining to a certain degree the heat generated by the lower portions of the tablet 13, whereby the efficiency of the tablet 13 is increased and its ability to generate the gas enhanced. We have found in practice that the tablet 13 burns down substantially uniformly and that the tablet 12 is consumed substantially uniformly, there being at the lower surface of the tablet 13 a thin layer or plate of the carbon, which does not become an ash until the tablet 12 has been entirely consumed. We have also found in practice that the creation of the gas is rapid and in the maximum volume, which is of great advantage. We consider it a feature of importance that the sides of the tablet 12 be protected by the non-inflammable walls of the receptacle 11, because in the absence of such protection a person carelessly applying the flame of a match to the carbon tablet 13 might ignite the tablet 12, and it is one of the purposes of our invention that the paraform shall not flame or be exposed to its accidental ignition from a flame.

What we claim as our invention, and desire to secure by Letters Patent, is—

1. As a new article of manufacture, the formaldehyde-gas generator comprising the tablet 12 of para-formaldehyde and the tablet 13 of carbon thereon and at its base substantially of the same surface area as the upper surface of said tablet 12; substantially as and for the purposes set forth.

2. As a new article of manufacture, the formaldehyde-gas generator comprising the tablet 12 of para-formaldehyde and the tablet 13 of carbon thereon and at its base substantially of the same surface area as the upper surface of said tablet 12, combined with a non-inflammable covering extending up the sides of said tablet 12 to said tablet 13; substantially as and for the purposes set forth.

3. As a new article of manufacture, the formaldehyde-gas generator comprising the tablet 12 of para-formaldehyde and the tablet 13 of carbon thereon and at its base substantially of the same surface area as the upper surface of said tablet 12, said tablet 13 above its base being substantially of cone shape; substantially as and for the purposes set forth.

Signed at New York, in the county and State of New York, this 3d day of February, 1902.

RINGGOLD W. CARMAN.
FREDERICK M. LAWRENCE.

Witnesses:
ARTHUR MARION,
CHAS. C. GILL.